(12) United States Patent
Brandmüller et al.

(10) Patent No.: US 9,481,530 B2
(45) Date of Patent: Nov. 1, 2016

(54) DEPALLETIZING SYSTEM AND REMOVAL UNIT

(71) Applicants: Ludwig Brandmüller, Rosenheim (DE); Herbert Fellner, Kolbermoor (DE)

(72) Inventors: Ludwig Brandmüller, Rosenheim (DE); Herbert Fellner, Kolbermoor (DE)

( * ) Notice: Subject to any disclaimer, the term of this patent is extended or adjusted under 35 U.S.C. 154(b) by 0 days.

(21) Appl. No.: 14/367,724

(22) PCT Filed: Dec. 20, 2012

(86) PCT No.: PCT/EP2012/076491
§ 371 (c)(1),
(2) Date: Nov. 19, 2014

(87) PCT Pub. No.: WO2013/092915
PCT Pub. Date: Jun. 27, 2013

(65) Prior Publication Data
US 2015/0078877 A1  Mar. 19, 2015

(30) Foreign Application Priority Data

Dec. 20, 2011 (DE) .................. 10 2011 056 682

(51) Int. Cl.
*B65G 47/31* (2006.01)
*B65G 59/04* (2006.01)
*B65G 59/02* (2006.01)
*B65G 59/00* (2006.01)
*B65G 61/00* (2006.01)

(52) U.S. Cl.
CPC ............ *B65G 59/04* (2013.01); *B65G 59/005* (2013.01); *B65G 59/02* (2013.01); *B65G 59/023* (2013.01); *B65G 59/026* (2013.01); *B65G 61/00* (2013.01)

(58) Field of Classification Search
CPC ..................................................... B65G 59/04

USPC ......... 414/794.2, 795.9, 796.2, 796.3, 796.5, 414/796.6, 796.7, 796.9, 797.2, 798.9, 928, 414/929
See application file for complete search history.

(56) References Cited

U.S. PATENT DOCUMENTS

| 3,917,082 | A | * | 11/1975 | Howard ................ | B65G 47/31 |
| | | | | | 414/796.2 |
| 4,493,599 | A | * | 1/1985 | Hartness et al. ........... | 414/796.2 |
| 4,753,564 | A | | 6/1988 | Pearce et al. | |
| 4,804,306 | A | * | 2/1989 | Schulte ...................... | 414/796.2 |
| 4,911,608 | A | * | 3/1990 | Krappitz ................ | B25J 13/086 |
| | | | | | 294/87.1 |
| 5,174,712 | A | * | 12/1992 | Focke .................. | B65H 3/0816 |
| | | | | | 294/185 |
| 5,265,712 | A | | 11/1993 | Krieg | |
| 5,417,543 | A | * | 5/1995 | Focke .................. | B65B 19/228 |
| | | | | | 414/796.9 |
| 6,379,106 | B1 | * | 4/2002 | Baldi ........................ | 414/796.9 |

(Continued)

FOREIGN PATENT DOCUMENTS

| CN | 2130796 | | 4/1993 | |
| DE | 4206038 A1 | * | 9/1993 | ............. B65G 57/04 |
| DE | 195 15 998 | | 11/1996 | |
| DE | 102007054867 | * | 5/2009 | .......... B25J 15/0004 |
| DE | 102008035330 | * | 2/2010 | ............. B65G 59/02 |
| EP | 0354873 | | 2/1990 | |

(Continued)

OTHER PUBLICATIONS

Office Action dated Jun. 3, 2015 in corresponding CN App. No. 201280063702.3.

*Primary Examiner* — Gregory Adams
(74) *Attorney, Agent, or Firm* — Boyle Friedrickson S.C.

(57) ABSTRACT

A depalletizing system is disclosed which enables fully automatic depalletizing. Furthermore, a removal unit with at least one 'knife edge' is disclosed. The latter may have an all-around belt which wraps around a drive pinion and a deflection.

19 Claims, 19 Drawing Sheets

(56) References Cited

U.S. PATENT DOCUMENTS

| | | | | |
|---|---|---|---|---|
| 6,652,014 | B2 * | 11/2003 | Schmalz | B65G 47/91 294/65 |
| 2002/0172586 | A1 * | 11/2002 | Donner | B65G 59/023 414/796.9 |
| 2009/0136333 | A1 * | 5/2009 | Schafer | 414/807 |
| 2009/0148266 | A1 * | 6/2009 | Baumann et al. | 414/796.2 |
| 2010/0147656 | A1 * | 6/2010 | Honeycutt et al. | 198/824 |

FOREIGN PATENT DOCUMENTS

| | | | |
|---|---|---|---|
| EP | 0742166 | 11/1996 | |
| EP | 1445220 A2 * | 8/2004 | ............ B65G 59/04 |
| EP | 1890054 | 2/2008 | |
| GB | 2168024 | 6/1986 | |
| JP | 2004203621 | 7/2004 | |
| WO | WO 2009103100 A1 * | 8/2009 | ............ B65G 59/00 |
| WO | WO 2010097088 A1 * | 9/2010 | ............ B65G 47/90 |

* cited by examiner

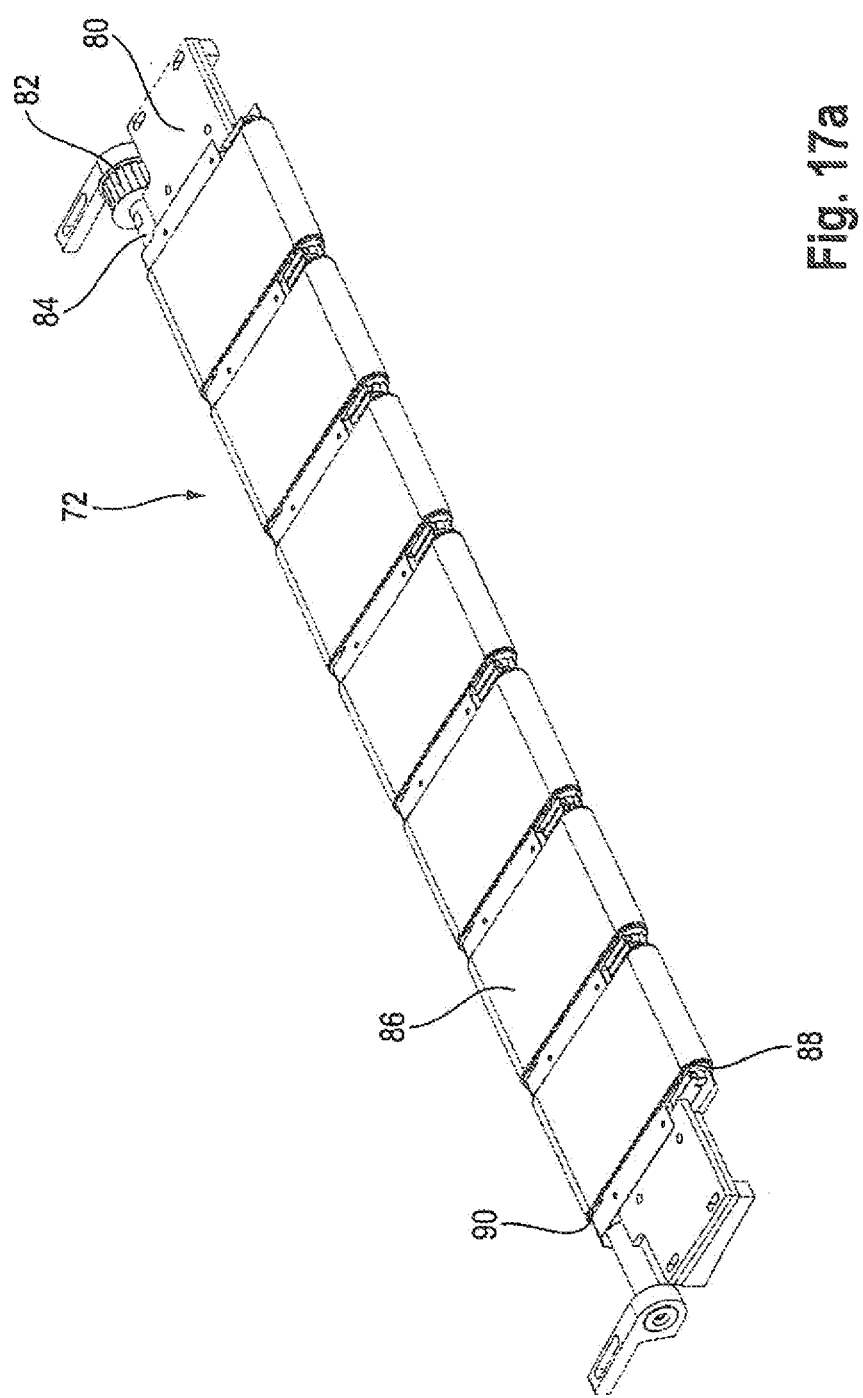

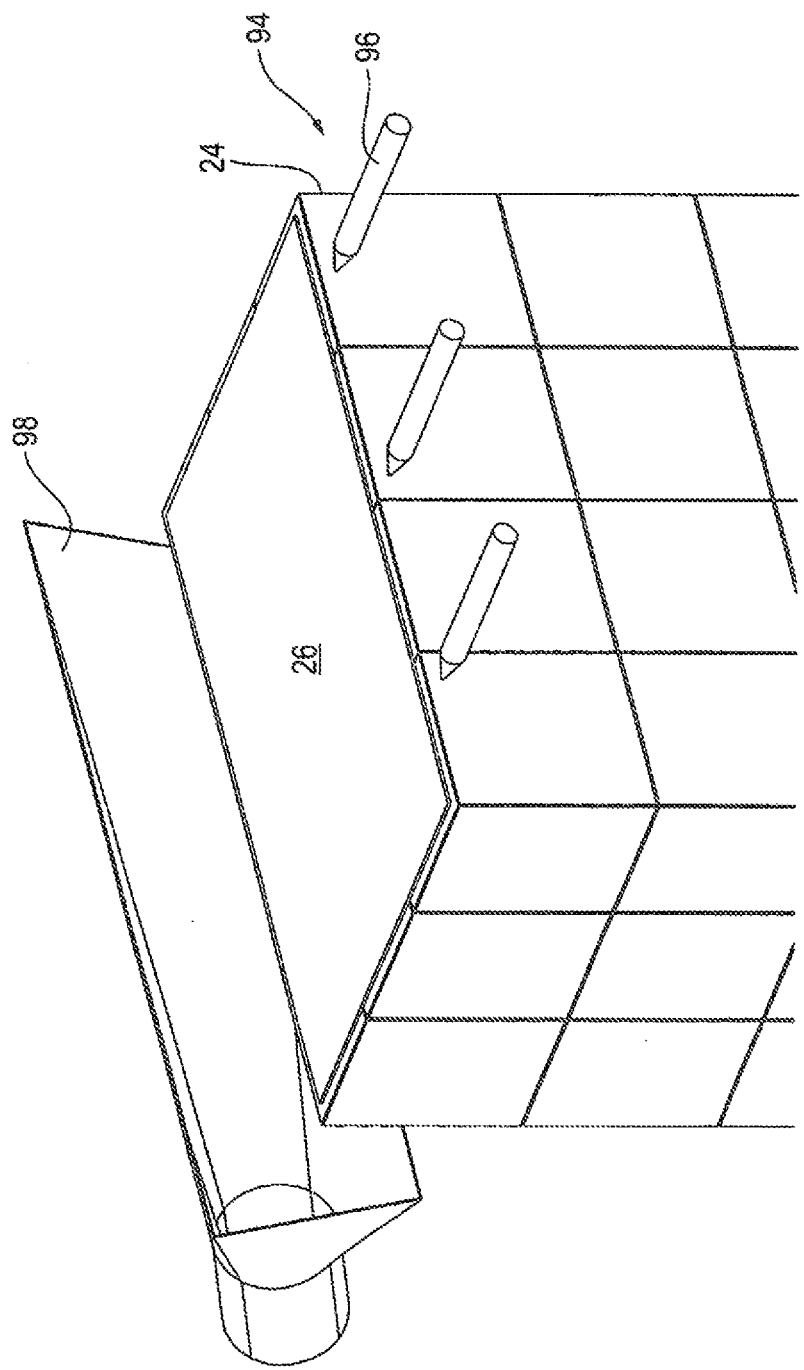

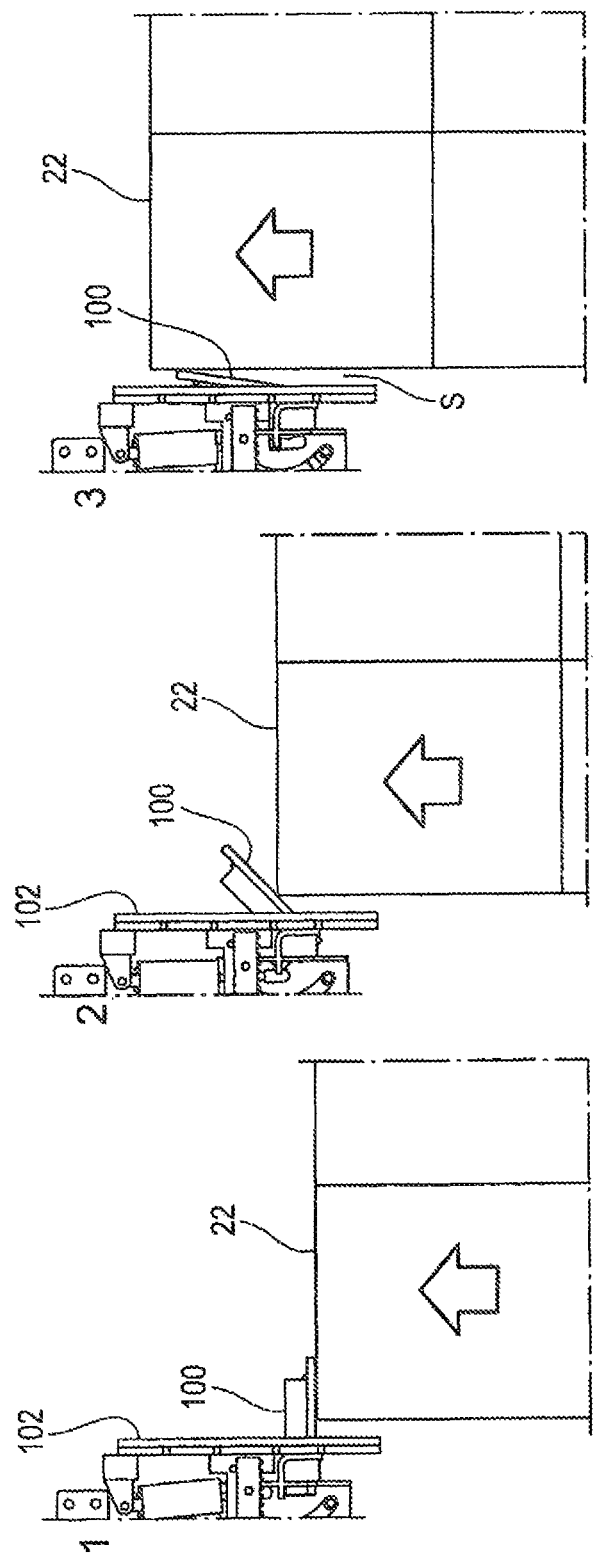

DEPALLETIZING SYSTEM AND REMOVAL UNIT

BACKGROUND OF THE INVENTION

1. Field of the Invention

The invention relates to a depalletizing system for a plurality of products stacked on pallets in layers according to the claims.

2. Description of Related Art

Especially major trade chains and discount stores face huge logistic expenditures for distributing the goods to their sales centers and sales outlets. Thereby the unmixed products are often temporarily stored in large amounts on so-called customer trays in corresponding high-bay storages in large distribution centers. These products are, however, delivered by the manufacturer to the distribution center unmixed and in layers on manufacturer pallets it is then required for the temporary storage to depalletize the unmixed pallets in layers.

This depalletizing of the unmixed products is significantly more difficult than the manufacturer's palletizing, since thus far large-scale manual depalletizing has been necessary due to the different forms, sizes, weights, and surface structures as well as the different outer packaging (trays, cartons, foils, papers, . . . ), and consequently great personnel expenditures ensue. The personnel's health is also strongly impaired by this manual depalletizing in the course of the shifts, whereby the law limits the maximum load to be lifted during a shift to 3000 kg/person.

In order to minimize these personnel expenditures, EP 1 890 054 B1 discloses a robot-assisted solution in which, for depalletizing, a removal unit laterally seizes a layer to be lifted of the products/trading units arranged on the pallet with two rollers in a frictionally-engaged way, and lifts the layer, and then runs in two support bases from these sides so that the lifted layer is supported. This layer is then put on the afore-mentioned customer tray and temporarily stored unmixedly in the high-bay storage.

It is a disadvantage of this known solution that some product layers are not stable enough for being laterally lifted in a frictionally-engaged way, since, for example, the products themselves or their outer packaging are deformed when the rollers are applied. In this case, the products have to be manually depalletized as was described in the beginning.

In U.S. Pat. No. 5,265,712, a similar system is described in which lifting is not carried out by rollers, but by a so-called 'knife edge' in which a belt wraps around a rolling arrangement and which has a deflection pulley with a small diameter on the front side. This front side laterally seizes—similar to the afore-described embodiment—the layer to be lifted so that it is lifted over the revolving belt, and the knife edge can run in under the layer to lift it.

Such an arrangement has the same disadvantages as the afore-described robot solution.

SUMMARY OF THE INVENTION

In view of this, the invention is based on the object to create a depalletizing system and a correspondingly suitable removal unit with which different products can be reliably depalletized.

This object is solved concerning the depalletizing systems with the features of patent claim 1 and concerning the removal unit with the features of independent patent claim 16.

Advantageous embodiments of the invention are subject matter of the dependent claims.

The depalletizing system according to the invention for a plurality of products stacked on pallets in layers has a frictionally-engaging removal unit, via which at least one friction element is laterally applicable to the layer of products to lift the layer so that at least one support base can be run in. The depalletizing system according to the invention moreover has a vacuum removal unit, via which a layer of products can also be lifted. Moreover, a central control unit is provided configured such that the frictionally-engaging removal unit and the vacuum removal unit are alternatively drivable depending on the product's properties.

This means that in the system according to the invention either the frictionally-engaging removal unit or the vacuum removal unit is used, or both are used together to lift a product layer from the stack depending on the product's properties—thereby, vastly different trading units can be depalletized regardless of the properties of the actual products or their outer packaging so that personnel expenditures are greatly decreased as compared to usual solutions. Since both removal units are integrated into the depalletizing system, the device-related expenditures and the necessary available space are minimal.

In an alternative solution, the depalletizing system is embodied with a pre-centering unit, via which the delivered stack without foil is at first positionally centered after delivery by the manufacturer—this pre-centering unit is also driven depending on the product via the afore-mentioned control unit. This is necessary, since the manufacturers use different pallet dimensions and since the products are not always stacked in alignment with the pallet base, but they either protrude over the pallet base or do not fill the whole pallet surface.

The Applicants reserve for themselves to formulate independent claims directed at a depalletizing system with a vacuum removal unit and a removal unit or removal unit and pre-centering unit.

In one embodiment of the invention, a lifter is additionally provided for picking up intermediate or top layers from the stack and for taking these intermediate or top layers to an output station. In the solutions described at the beginning it is necessary that such intermediate or top layers are removed by hand—with the afore-described measure according to the invention this part of manual labor can be omitted.

The intermediate or top layers may be sent to an intermediate-layer storage or they may be directly taken out of the depalletizing system.

The lifter for removing the intermediate or top layers is preferably embodied as a vacuum lifter or alternatively as a mechanical gripping device.

In one embodiment of the invention, delivery of the pallets palleted by the manufacturer is carried out in a first supply level. After removal of the foil the pallets they are conveyed according to the invention via a pallet lift integrated in the depalletizing system to a second level lying above and there they are depalletized by the described units. The pallet lift is controlled by the control unit for taking the layer to the removal level.

To prevent deformation of the stack or the pallets during this lifting, the pallet lift may be provided with support posts, which support the pallet's top boards from below through the pallet and thus support the product stack.

Depalletizing can be executed especially accurately if a layer centering is provided in the area of the removal units, the layer centering centering and/or holding the layer which remains on the stack and lies underneath the one being lifted to prevent accidentally moving this layer.

The control unit may be configured such that the holding force can be controlled depending on the product.

According to the invention, it is preferred that the depalletizing system is embodied with a supply and discharge station for customer-trays, via which empty trays can be supplied, onto which the lifted layer can be placed.

In an embodiment which builds very compactly, the frictionally-engaging removal unit, the vacuum removal unit and/or the lifter are arranged above the pre-centering unit.

The frictionally-engaging removal unit may be arranged below the vacuum removal unit or below the lifter as seen in the gravitational direction.

In one embodiment, the vacuum removal unit and the lifter are movably mounted at the depalletizing system in a parallel direction.

Since the separation level between adjacent layers varies depending on the product, a suitable sensor, for example a camera or such means, for detecting this separation level may be provided, the sensor's signal being processed for controlling the afore-described units via the control unit.

In order to facilitate separating the intermediate layers, a blowing device may be provided with at least one compressed-air nozzle and, if applicable, a suction head, via which the blown-off intermediate layer may be discharged.

The relative positioning of the product layer to be lifted may be facilitated by sensing flaps, which are pivoted when lifting the source pallet to enable drawing conclusions about the lifting position. These sensing flaps may be embodied with a double function if they facilitate or take on lateral guiding of the product stack when being in a pivoted state.

The at least one friction element of the removal unit may be embodied as a friction roller or knife edge, and this friction element may seize the layer to be lifted on one or on two sides. The removal unit according to the invention is embodied as a 'knife edge', in which at least one belt wraps around a drive pinion and a deflection, wherein a deflection region of this belt is brought into contact with the good to be separated, and the intermediate layer is lifted via correspondingly driving the belt so that the removal unit can run in with the knife edge under the product layer and can be lifted. The term 'knife edge' is understood to be a conveying/lifting device, in which an endless belt/strap wraps around a drive element and a deflection. The drive element may be a drive pinion which is in an operative connection with the belt/strap in a frictionally-engaged or form-fitted (gear belt) way. The deflection diameter is preferably a bit smaller than the drive element diameter.

This belt and the corresponding drive pinion may have a gear-belt-like profile so that a high drive torque without slip can be transferred.

According to one version of the invention, the deflection of the belt of the 'knife edge' is not carried out via a roller, but via a non-pivotable profile. This profile is configured such that the deflection is carried out with minimal friction. By using a non-movable deflection profile, according to the invention, significantly higher stability is achieved at the roll-up edge, and thus a significant functional improvement of the roll-up function as compared to commonly used knife edges with deflection pulleys. Instead of this profile, basically a common deflection pulley may also be used.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred embodiments of the invention are further described with the help of the following schematic drawings.

The drawings show:

FIG. 12: the layer lifted via the vacuum removal unit with support bases being run in;

FIG. 18: an embodiment with a blowing device, and

FIG. 19: an embodiment with a sensing flap.

DETAILED DESCRIPTION OF THE DRAWINGS

Figure 1:
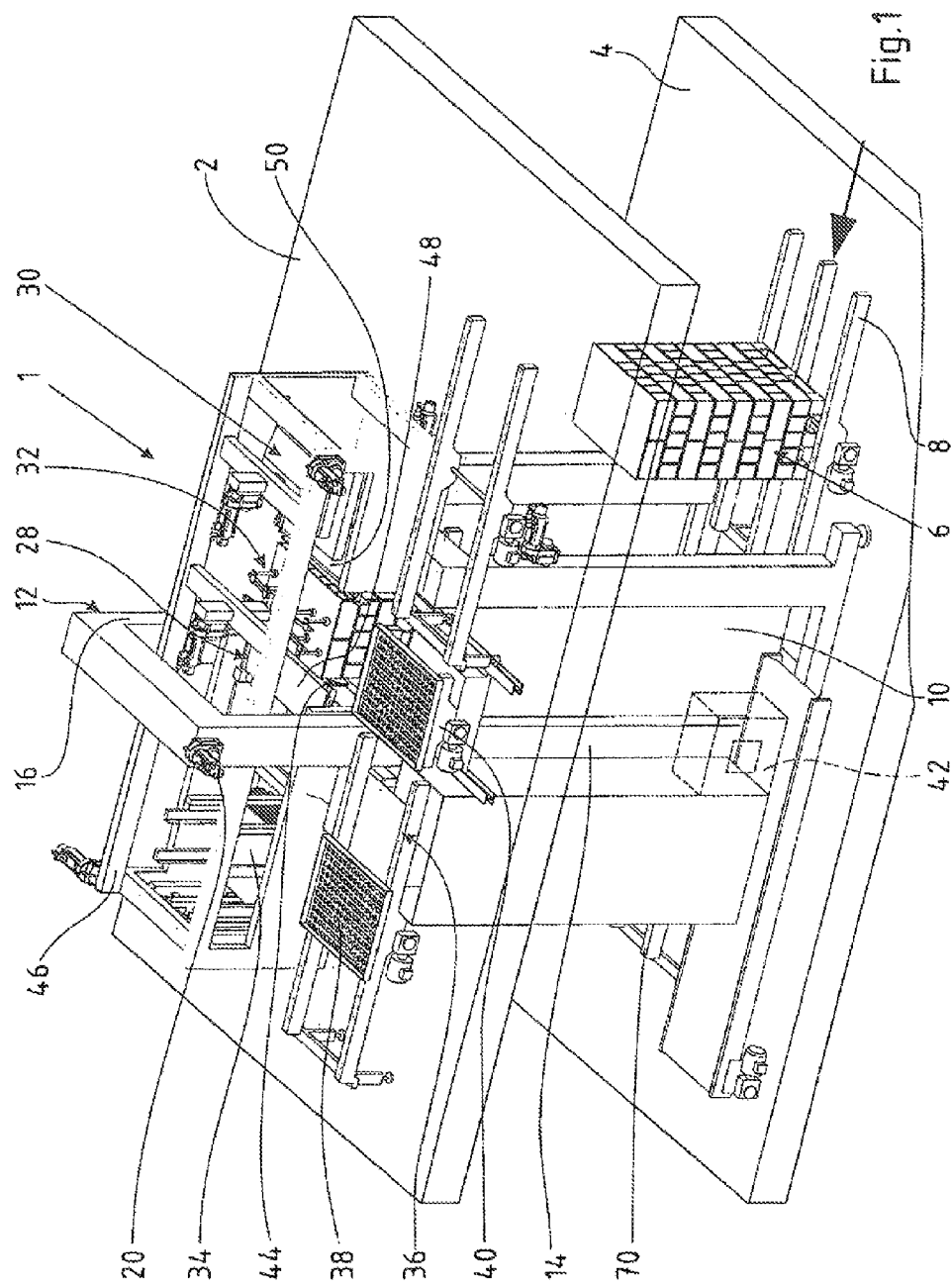
FIG. 1: a three-dimensional display of an embodiment of a depalletizing system.
Figure 2:
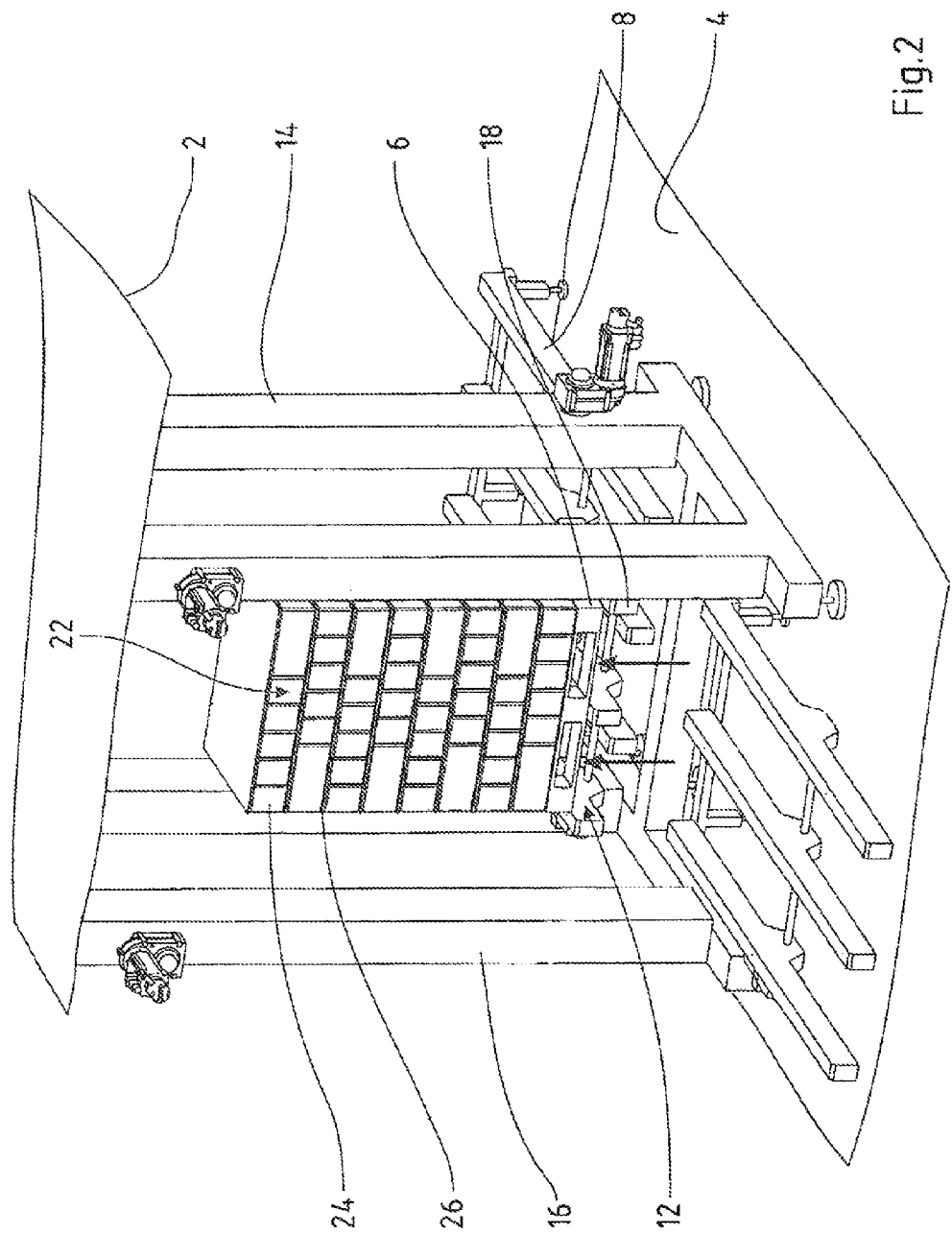
FIG. 2: a pallet lift of the depalletizing system of FIG. 1.

According to the display in FIG. 1, the depalletizing system 1 according to the invention extends over two levels 2, 4 wherein the supply of a pallet receiving unmixed products is carried out completely automatically via a pallet transport device 8. After removal of the foil the pallet 6 is then supplied to a pre-centering unit 10 which is embodied as a shaft centering in the displayed embodiment, and which encompasses the pallet 6 when a predetermined position is reached preferably from three sides, alternatively also from four sides, this also means from the supply direction, so that the product stack is positionally centered on the pallet 6. The pre-centered full pallet 8 is then lifted in the vertical direction and conveyed to level 2 via a pallet lift 12 indicated in FIG. 2. The depalletizing system has two vertical consoles 14, 16 which are covered by a gantry and between which a pallet support 18 is guided, which is driven by a servo drive 20 (see FIG. 1).

In order to prevent sagging and thus deformation of the product stack 22 arranged on the pallet 8, the pallet support 18 may be embodied with support posts (not shown), which either support the pallet from below or which support the stack 22 through the pallet 6 in the direction of the arrows (FIG. 2), so that the product stack 22 remains in its pre-centered position. In the display according to FIG. 2, the structure of the product stack 22 can be clearly seen, wherein it only contains products of one type, wherein intermediate or top layers 26 are formed between the layers formed by the products, which may be embodied as disposable products or as recyclable ones.

The depalletizing system 1 according to FIG. 1 has in the region of the upper level 2 a frictionally-engaging removal unit 28, which is further specified in the following, for lifting a layer 24 from the stack 22. The depalletizing system 1 moreover has a vacuum removal unit 30 via which light, soft, or sensitive products may be depalletized. Such a vacuum removal unit is not suited for heavy products, such as cartons filled with beverages, since these could tear when being lifted via the vacuum removal unit.

In addition to this vacuum removal unit 30 and the removal unit 28, the depalletizing system 1 has a vacuum lifter 32 via which the afore-described intermediate layers 26 may be picked up from the respective layer 24 to be picked up. In the embodiment shown in FIG. 1, the intermediate layers 26 picked up by the vacuum lifter 32 are supplied to an intermediate-layer storage 34 and stacked there. This stack can then be removed and supplied to reutilization.

Under unfavourable conditions it may happen that when lifting a layer 24, the intermediate layer 26 lying underneath sticks thereto and is also picked up. In order to prevent this, a holding-down/retaining device may be provided for the device according to the invention, via which the intermediate layer is held on the next layer lying beneath it. This may, for example, be accomplished via gripper fingers which are laterally arranged above the layer centering and which retain the intermediate layer until it is removed. Thereby it can be prevented that an intermediate layer is placed between the customer tray and the rolled-off or respectively blown-off layer 24. The holding-down/retaining device is not shown in the described embodiments.

The depalletizing system 1 furthermore has a discharging station 36, which is also driven by servo motors, and via which customer trays 38 may be supplied to a transfer carriage 40 which is driven by a servo motor. The lifted layer 24 is then put down onto this customer tray 38—as is described in the following—and then conveyed to the high-bay storage or to the temporary storage via the discharging station 36.

The afore-described units are driven by servo motors which, are driven via a control unit 42 indicated by a dashed line.

In order to prevent that the product stack is unwantedly moved during lifting the upper layer, the depalletizing system 1 is moreover embodied with a layer centering 44, via which the layer underneath the layer 24 to be lifted is centered and held.

According to the display in FIG. 1, the vacuum lifter 32 and the vacuum removal unit 30 are guided parallel to each other along a parallel guide 46, which extends through a gantry of the pallet lift 12 and which is arranged laterally thereto. The vacuum removal unit 30 and the vacuum lifter 32 are guided on the parallel guide 46 via carriages.

The frictionally-engaging removal unit 28 is arranged below the vacuum removal unit 30 and the vacuum lifter 32.

The depalletizing system 1 moreover has two support bases 48, 50, which can be run in laterally, which can be run in under the lifted layer 24 to support it and via which the layer 24 can be transferred to the customer tray 38, which is run in by the transfer carriage 40.

The fully automatic depalletizing is now explained based on the FIGS. 1 to 13, wherein all functions are controlled via the control unit 42—manually intervening is at most necessary in case of failure.

The unmixed pallet delivered by the manufacturer is delivered to the lowest level 4 and is supplied to the pre-centering unit 10 via the pallet transport device 8, wherein the pallet stack is freed from foil. The pre-centered, loaded pallet 6 is then lifted via the pallet lift 12 according to FIG. 2, wherein the pallet support 18 is guided along the vertical consoles 14, 16. According to the display in FIG. 1, these are overlapped above the parallel guide 46 by the gantry.

Figure 3:
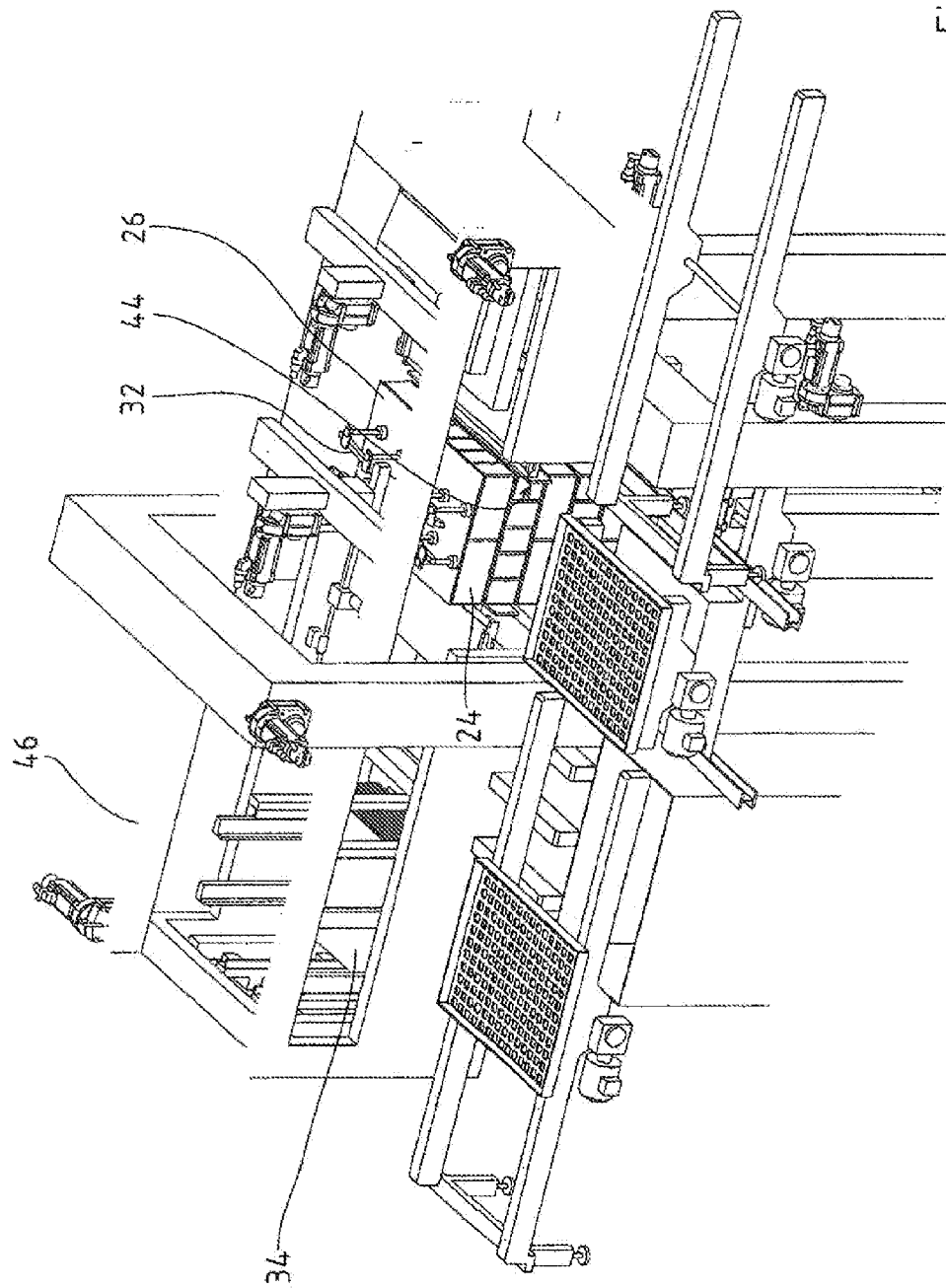
FIG. 3: an enlarged display of a part of the depalletizing system according to FIG. 1.

After moving the product stack 22 to the level 2, according to the display in FIG. 3, the layer centering 44 closes so that the layer arranged underneath the layer 24 to be lifted is centered and held. The intermediate layer 26 is then lifted via the vacuum lifter 32 and moved along the parallel guide 46 to the temporary storage 34 and stacked there.

Figure 4:
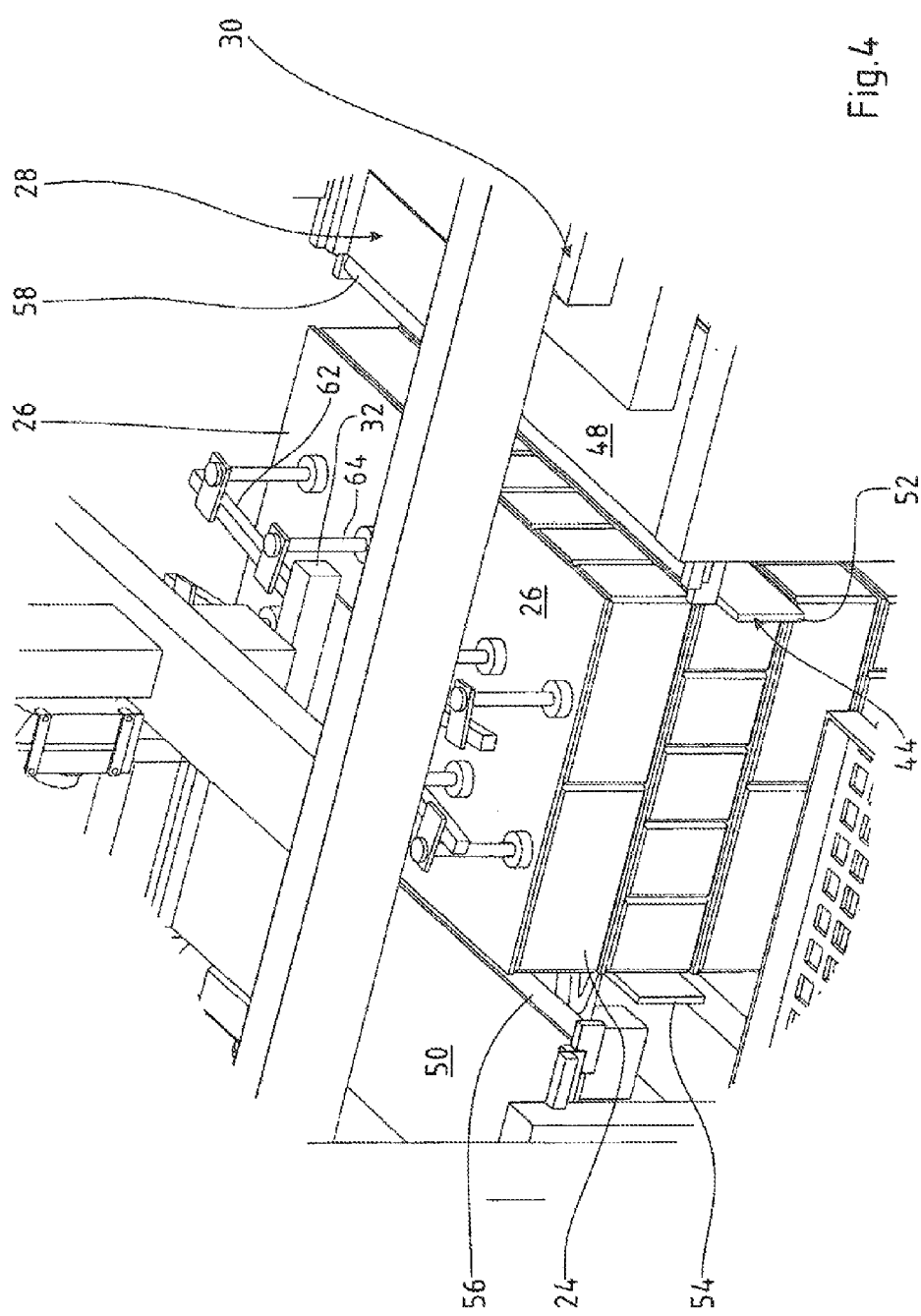
FIG. 4: an additionally enlarged display of a removal unit and a vacuum lifter of the depalletizing system.

FIG. 4 shows this process in an enlarged display. The two posts 52, 54 of the layer centering 44 can be seen clearly, which laterally seize the layer arranged underneath the layer 24 to be lifted and center and hold it. The vacuum lifter 32 is lowered onto the intermediate layer 26 in the direction of its suction position. In the display according to FIG. 4, the structure of the removal unit 28 can be seen clearly as well, which seizes the layer 24 on both sides and which has two friction rollers 56, 58, which are arranged at the front side of the two support bases 48, 50. The level of the friction rollers 56, 58 thereby lies above the operating level of the layer centering 44.

The vacuum lifter 32 has an approximately X-shaped vacuum head 62, at which the suction devices 64 are arranged which seize the intermediate layer 26. These are connected to a vacuum pump which is not shown, to which the suction system of the vacuum removal unit 30 is connected as well.

The display according to FIG. 4 shows the vacuum removal unit 30 moved to its parking position.

Figure 5:
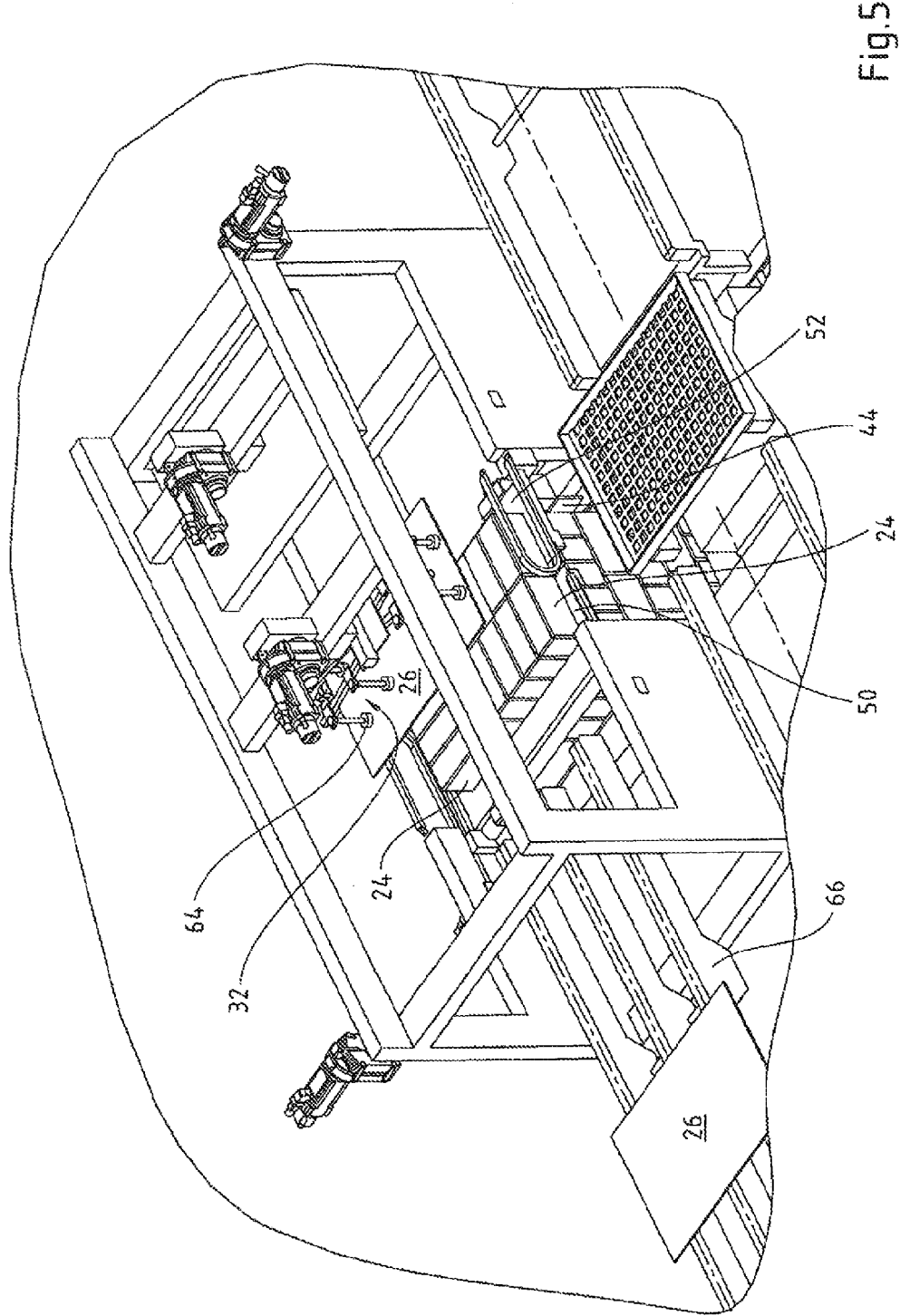
FIG. 5: an alternative embodiment of a depalletizing system.

FIG. 5 shows an embodiment, in which the vacuum lifter 32 lifted the intermediate layer 26 from the layer 24 to be lifted via its suction devices 64. In this version, however, the intermediate layer 26 is not moved to an intermediate-layer storage 34, but it is discharged via a conveyor device 66. This may end, for example, in the lower level 4 for disposal of the intermediate layers.

Simultaneously to lifting the intermediate layer 26, the removal unit 28 is brought to its operating position in the method step shown in FIGS. 3 and 4, in which both friction rollers 56, 58 laterally seize the layer 24 to be lifted and 'roll it up'. This means that the rotation direction of the two friction rollers 56, 58 is chosen such that the layer 24 is lifted, according to the display in FIG. 5, the two support bases 48, 50 then run in with the friction rollers 56, 58 into the separation layer between the lifted layer 24 and the layer held via the layer centering 44 so that the lifted layer 24 is supported.

Figure 6:
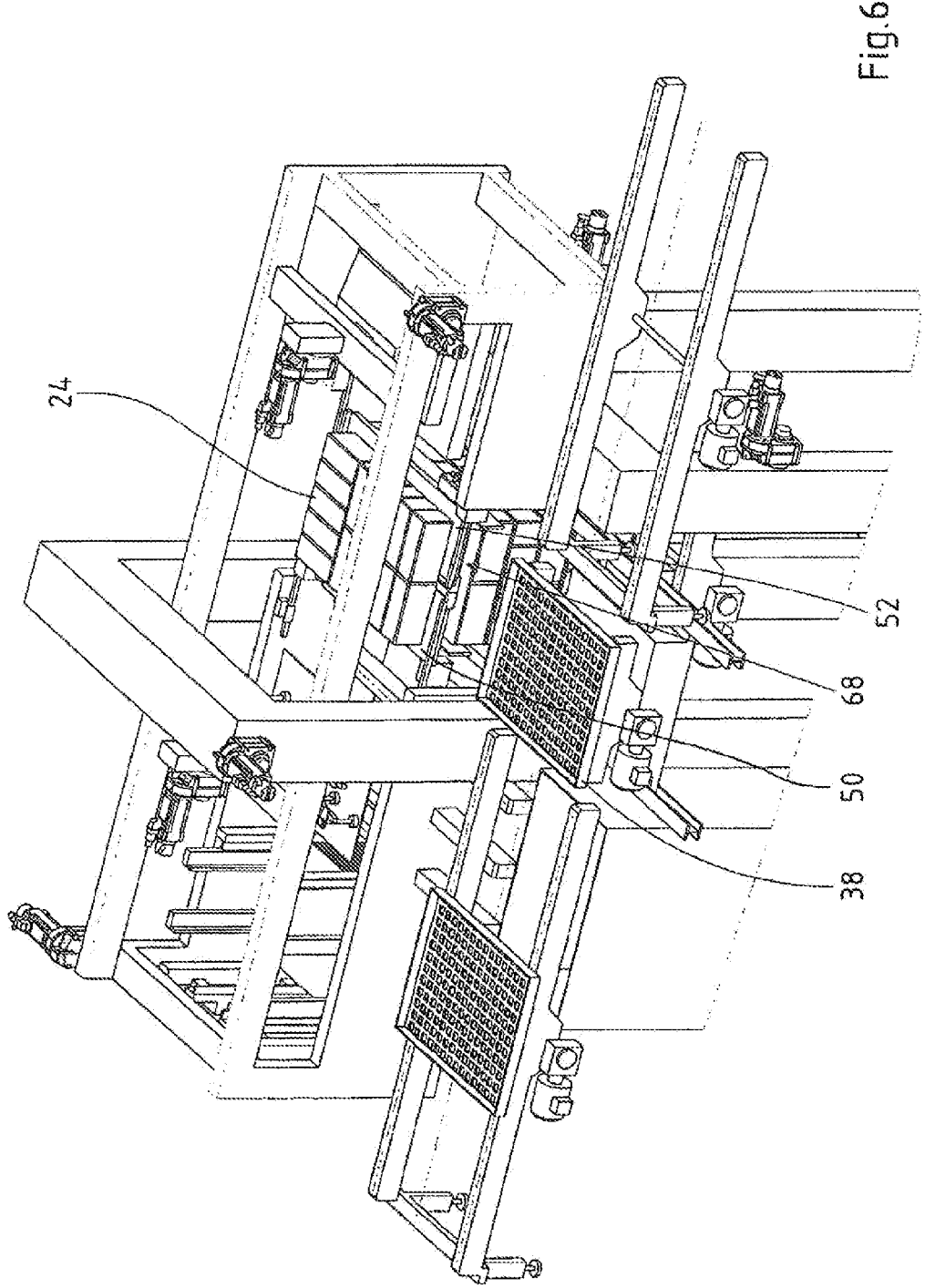
FIG. 6: the depalletizing system when lifting a layer.
Figure 7:
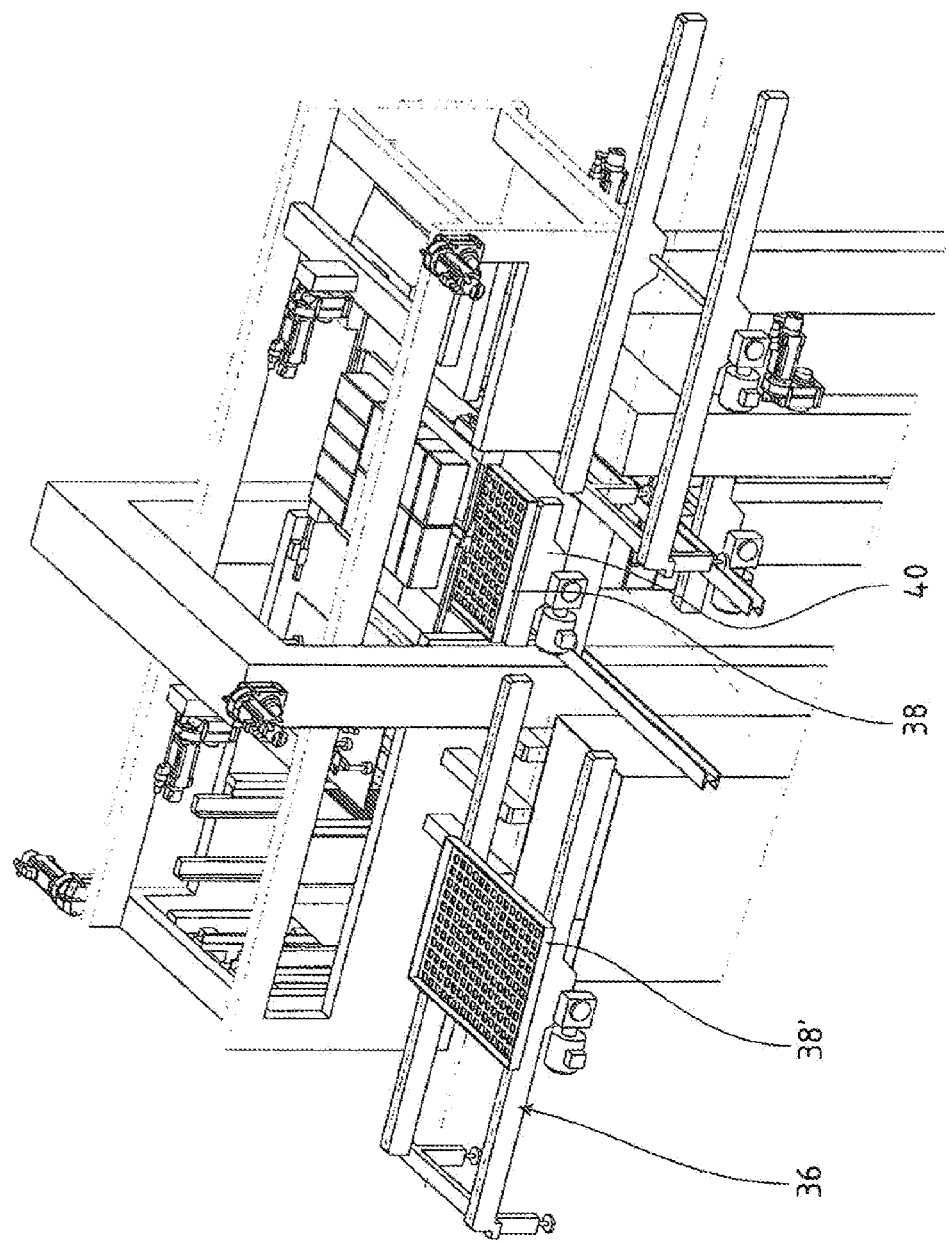
FIG. 7: running-in of a customer tray under the lifted layer.

In a following method step, the layer centering 44 is opened (see FIGS. 5 and 6) and the pallet 6 is then lowered with the remaining layers via the pallet lift 12 (FIG. 6). According to FIG. 7, the transfer carriage 40 with the customer tray 38 arranged thereon is then run into the opening gap 68 and the next customer tray 38' is moved to the waiting position via the discharging station 36.

Figure 8:
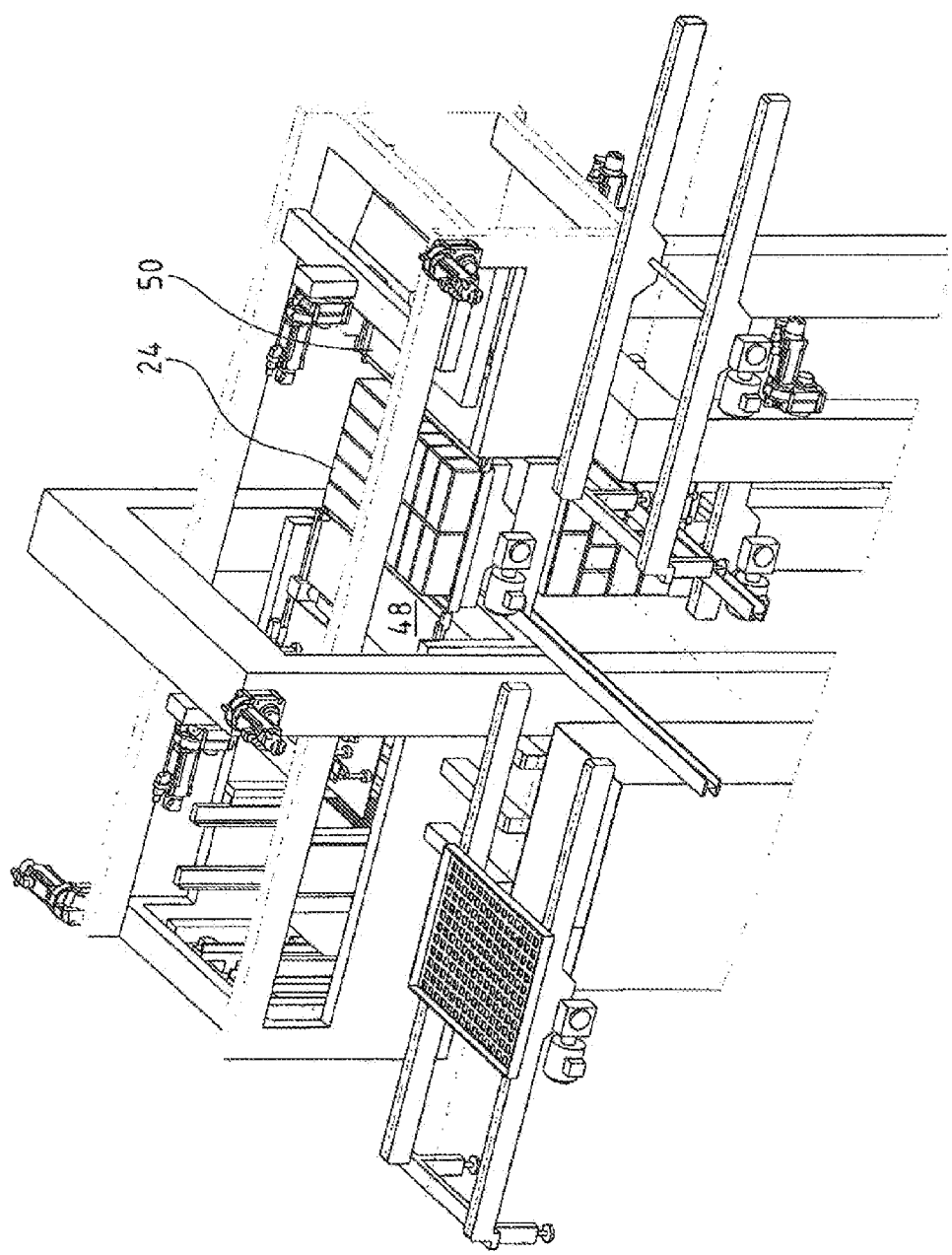
FIG. 8: putting down of the layers onto the customer tray.

In the step shown in FIG. 8, the two support bases 48, 50 are laterally moved out and the depalletized layer 24 is put onto the customer tray 38.

Figure 9:
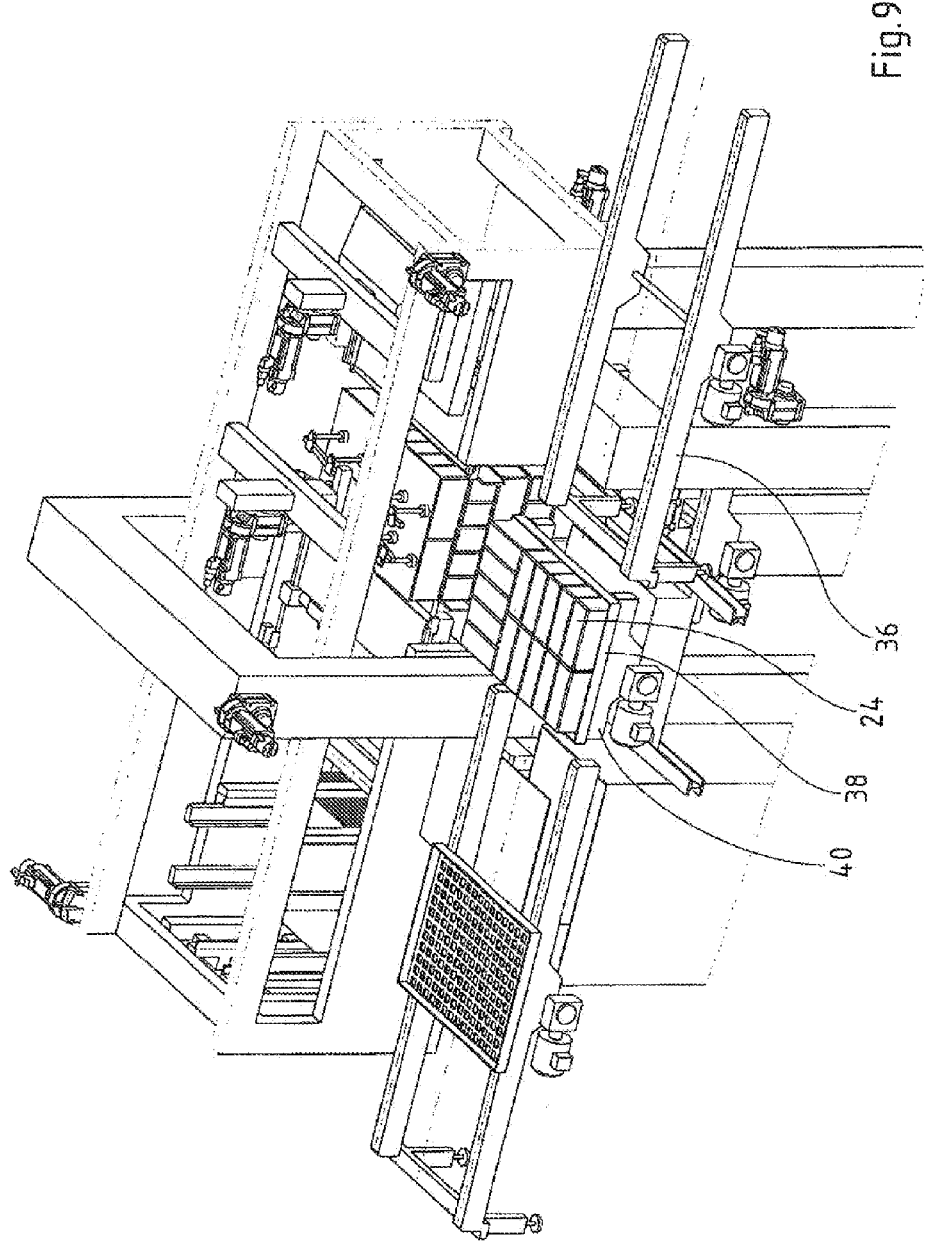
FIGS. 9 and 10: transfer of the loaded customer tray to a discharge station.

According to FIG. 9, this is then moved out of the lifting region via the transfer carriage 40 and transferred to the discharging station 36 and conveyed to, for example, the high-bay storage.

Figure 10:
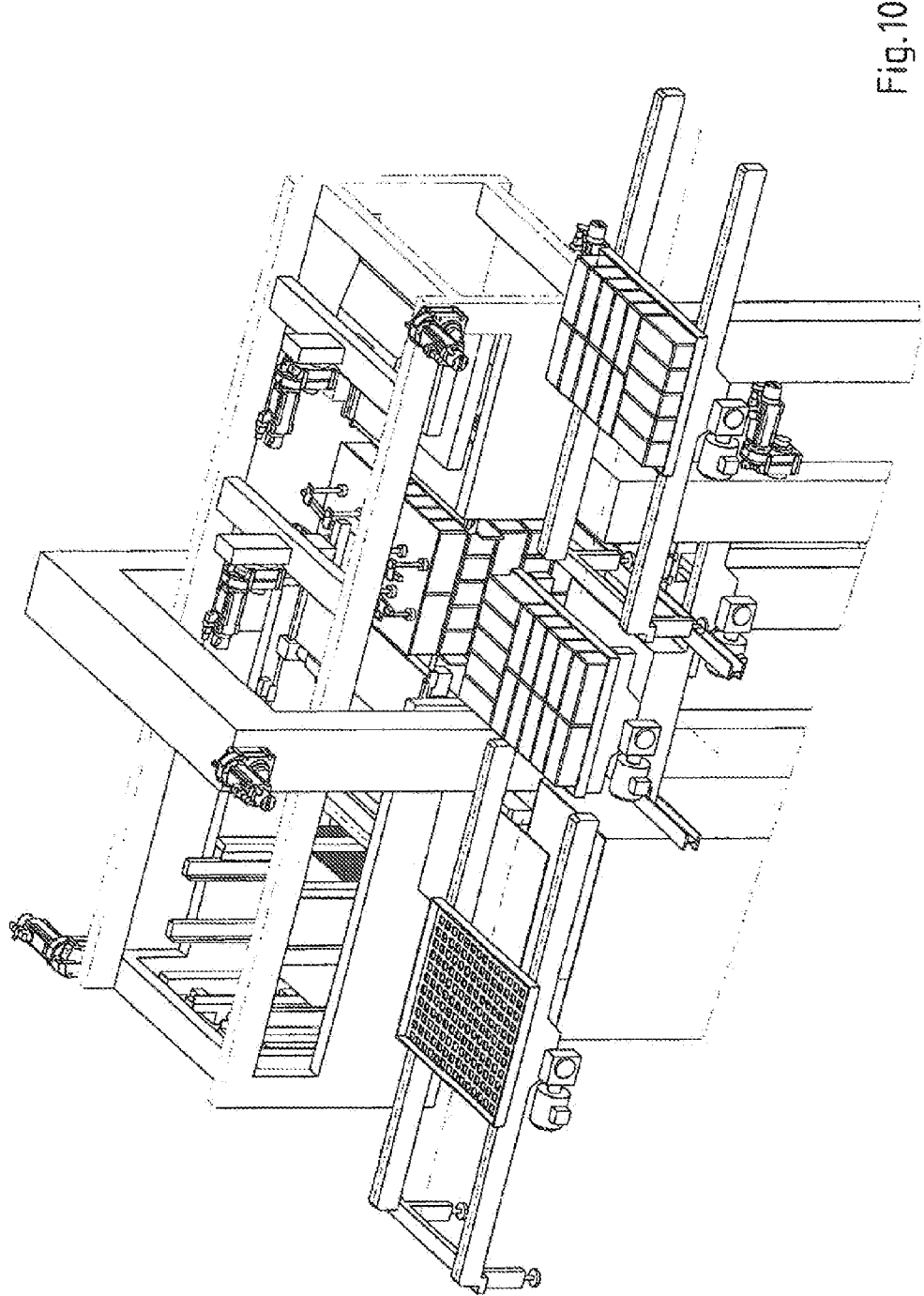
Figure 11:
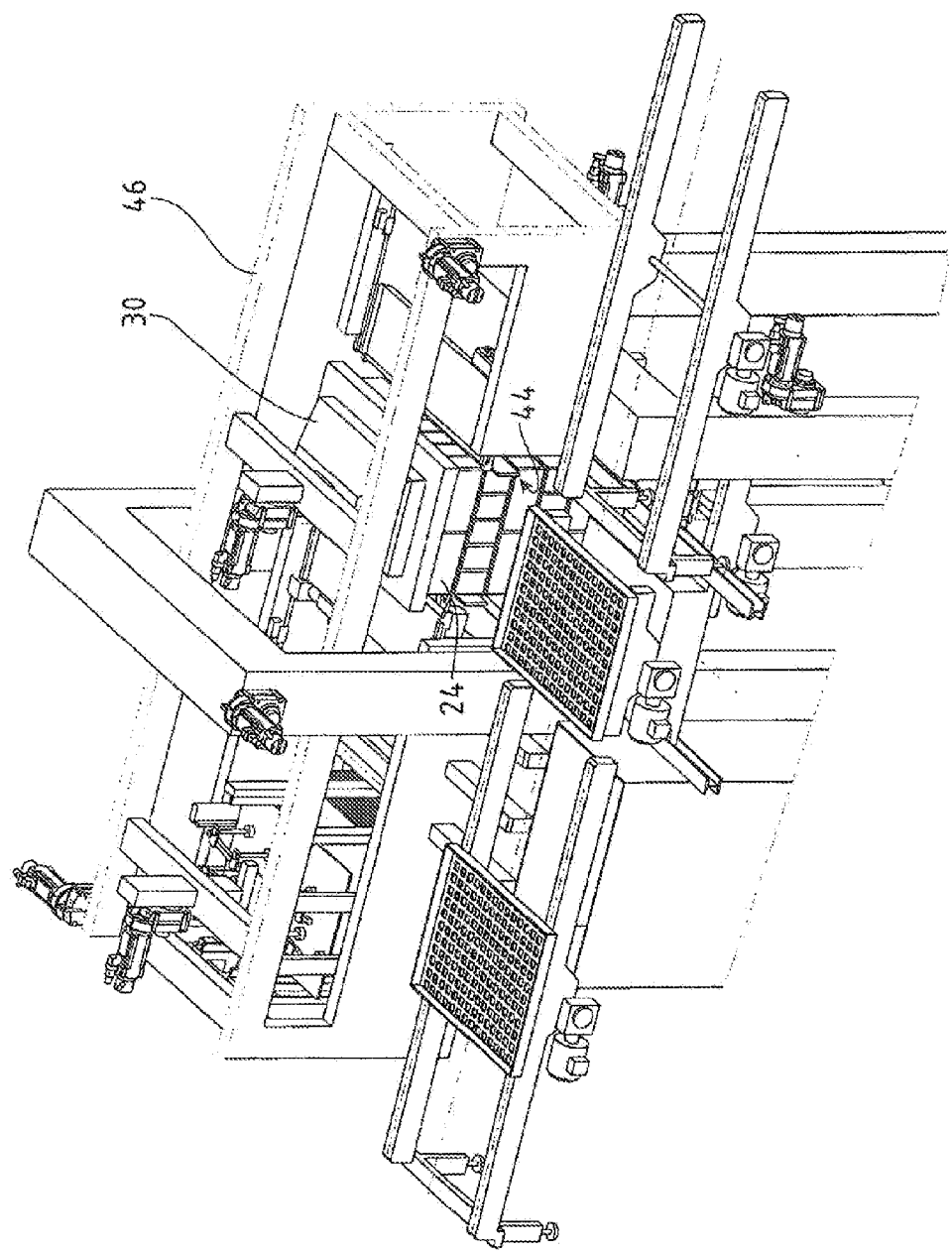
FIG. 11: the depalletizing system in a state in which a layer is lifted via a vacuum removal unit.
Figure 12:
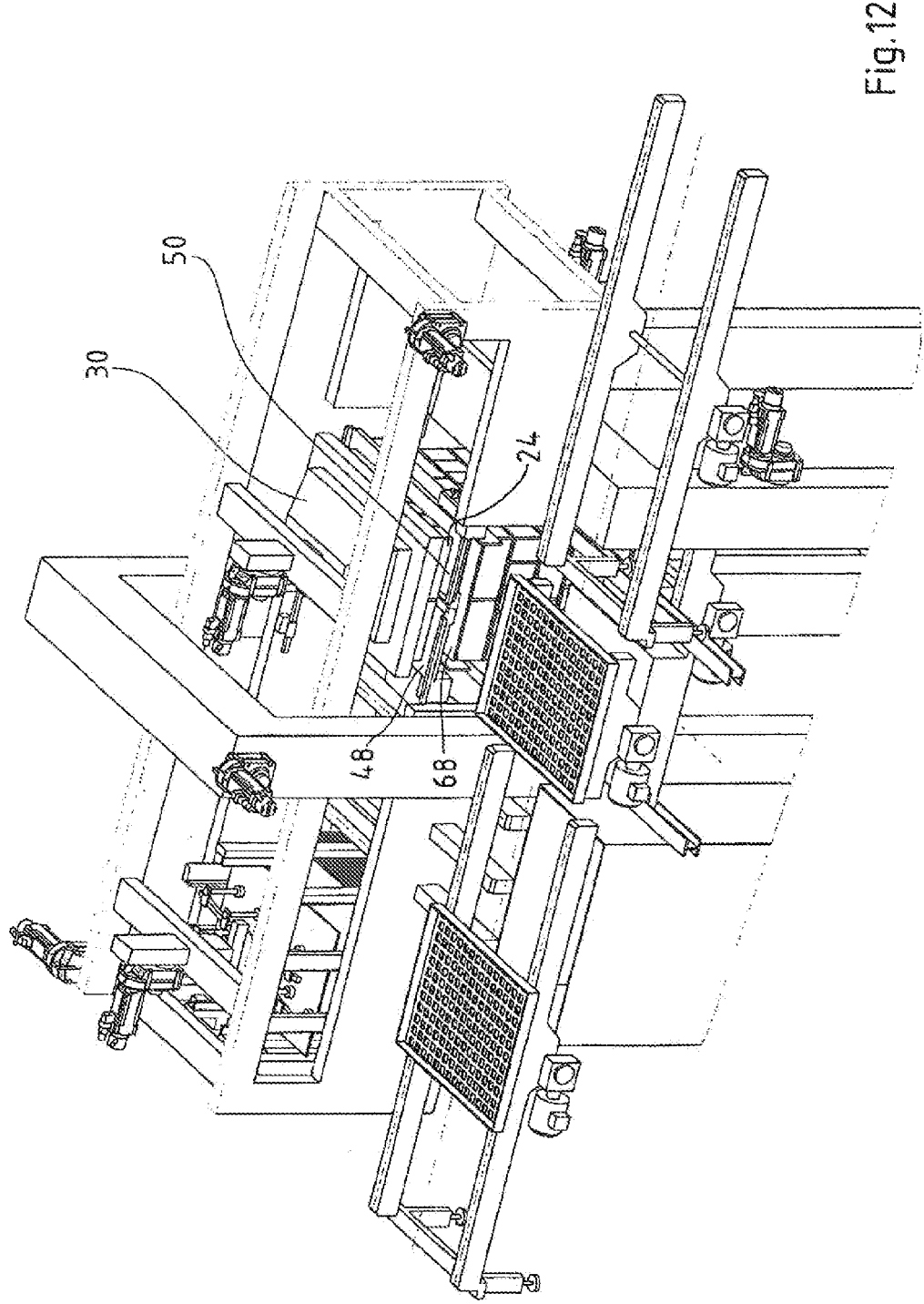

The afore-described process is repeated until the complete full pallet is empty (depalletized) (see FIG. 10). Subsequently, the pallet lift 12 moves to its starting position in the lower level 4 so that the empty pallet may be supplied to a pallet magazine or the like via a transport system 70 indicated in FIG. 1.

The depalletizing via the frictionally-engaging removal unit is preferably used for comparatively heavy, stable products. The vacuum removal unit 30 is used for depalletizing, for example, light or instable products. Supply of the full pallet to the lifting region is carried out as in the afore-described embodiment. After the already described lifting of the intermediate layer 24, according to FIG. 11, the layer centering 44 is closed to fixate the layer underneath the layer 24 to be lifted. Moreover, the vacuum removal unit 30 is moved over the layer 24 via the parallel guide 46. The vacuum removal unit 30 is then lowered for picking up the products of the layer 24 and the layer 24 is then lifted by approximately 100 mm via an integrated vertical lifting system.

The products 24 are secured against falling down via the two support bases 48, 50 which also run in, so that system failure due to falling products is virtually impossible. The two friction rollers 56, 58 are also moved, however, they are not driven when using the vacuum removal unit.

Figure 13:
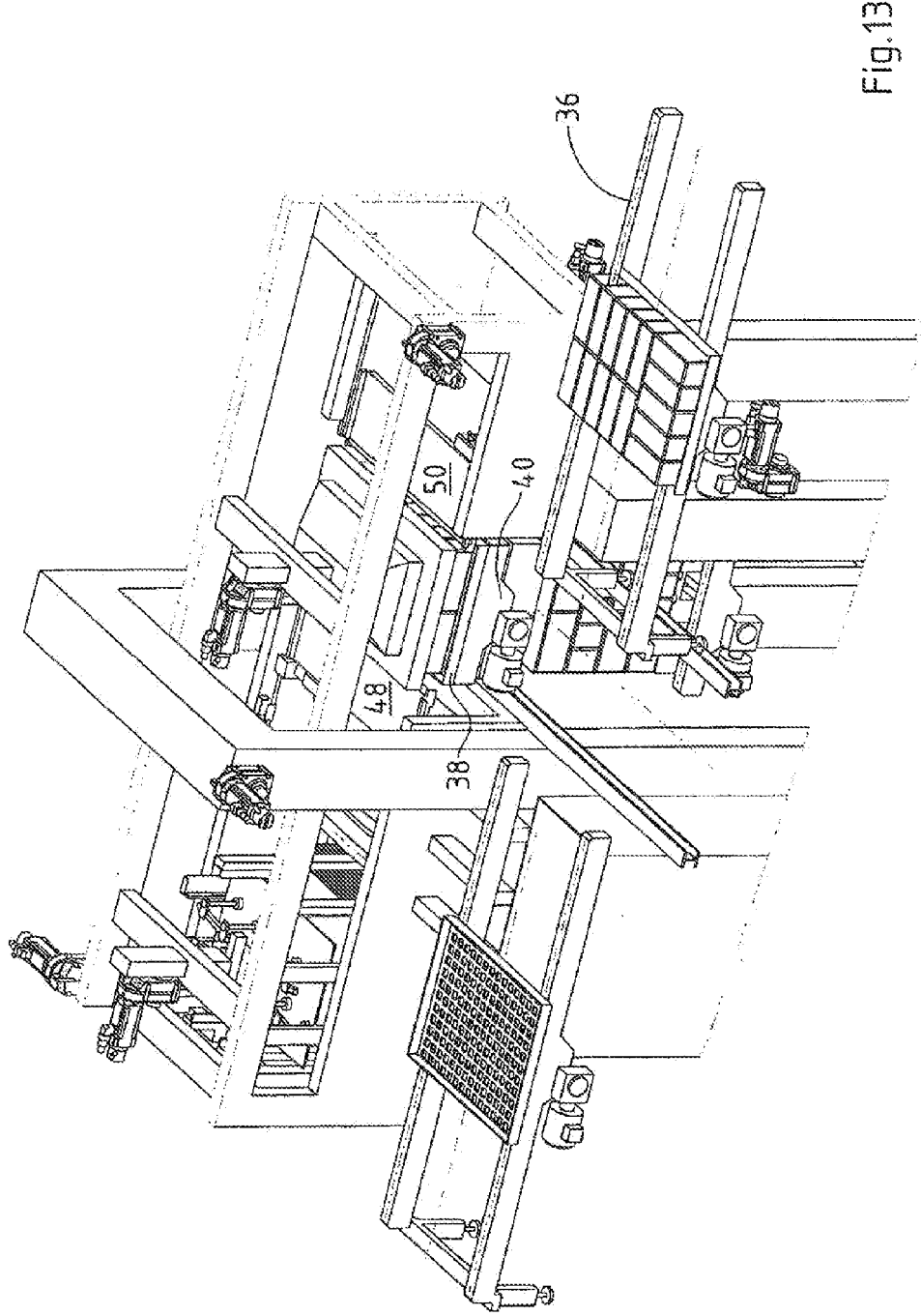
FIG. 13: putting down of the layer lifted via the vacuum removal unit onto the customer tray.

In a following method step, the layer centering 44 opens and the remaining layers arranged on the pallet 6 are lowered via the pallet lift 12, and then the customer tray 38 is moved into the opening gap 68 via the transfer carriage 40 in the afore-described way according to FIG. 13, and at the same time the two support bases 48, 50 are moved apart. The layer 24 is then put onto the customer tray 38 via the vacuum gripping system of the vacuum removal unit according to FIG. 13, and then transferred to the discharging station 36 via moving the transfer carriage 40, and conveyed to the temporary storage, for example, the high-bay storage.

Practically all types of packaging and products in the area of beverages, foods, and chemical industry that are on the market can be processed fully automatically by the depalletizing system according to the invention, wherein, for example, the sensing/scanning of the separation level between the layers 24 may be carried out via suitable sensors, for example, cameras, so that running in of the removal units (frictionally-engaging, via vacuum, or purely mechanic by shape or force-fitting) can be controlled very accurately via the pallet lift 12 and the layer centering 44. The system moreover has the advantage that by using the all-around centering when supplying the full pallet, the product to be processed is handled very carefully. This also ensures fully automatic processing without problems of, for example, pallets which have been displaced during transport with trucks. Naturally, further gripping systems may be integrated additionally or alternatively into the discharging system according to the invention and be driven via the control unit 42. It is principally also possible to depalletize mixed pallets with the depalletizing system, since the product type is detected via suitable sensors and the appropriate removal unit is chosen via the control unit. Depending on the product type and the pallet structure, the pre-centering unit 10 and the layer centering 44 are driven.

Figure 14:
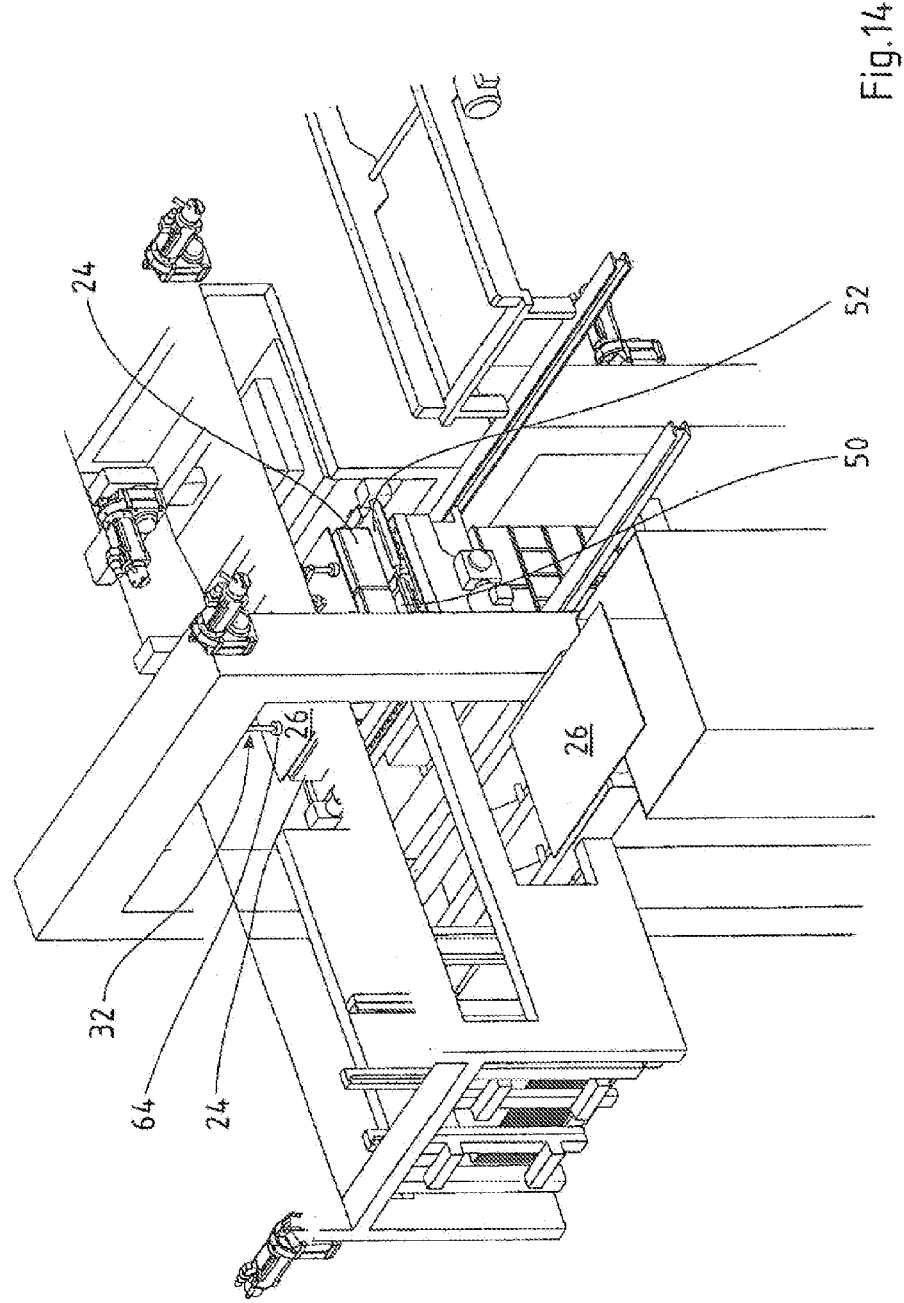
FIG. 14: one version of the embodiment shown in FIG. 5.

FIG. 14 shows a version of the embodiment shown in FIG. 5. In this, the intermediate layer 26 is discharged towards the left, approximately parallel to the moving direction of the customer trays. FIG. 14 shows a version in which the intermediate layer 26 is discharged forwards below the guide path of the transfer carriages 40, i.e. approximately parallel to the direction in which the layer 24 is moved onto the customer tray 38, and then disposed off and/or supplied to further use. In this case, the intermediate-layer storage 34 may be omitted. Discharging the intermediate layer 26 is then carried out, for example, via a so-called trash belt (not shown in FIG. 14).

As was already stated, the 'knife edge' described at the beginning may be used instead of the removal unit 28 with the two friction rollers 56. Thereby, an all-around belt wraps around a deflection device, which,—similar to the prior art—is formed by deflection pulleys or, preferably, by a deflection profile. Due to this deflection profile, the roll-up edge is significantly stabilized so that the roll-up function is improved as compared to a version with a deflection pulley.

Figure 15:
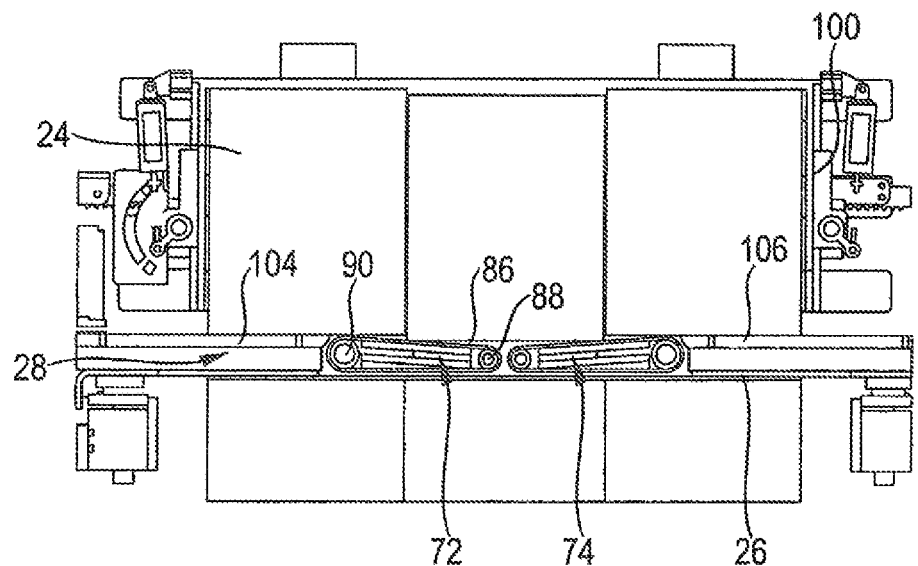
FIG. 15: an additional embodiment of a removal unit with a knife edge.
Figure 16:
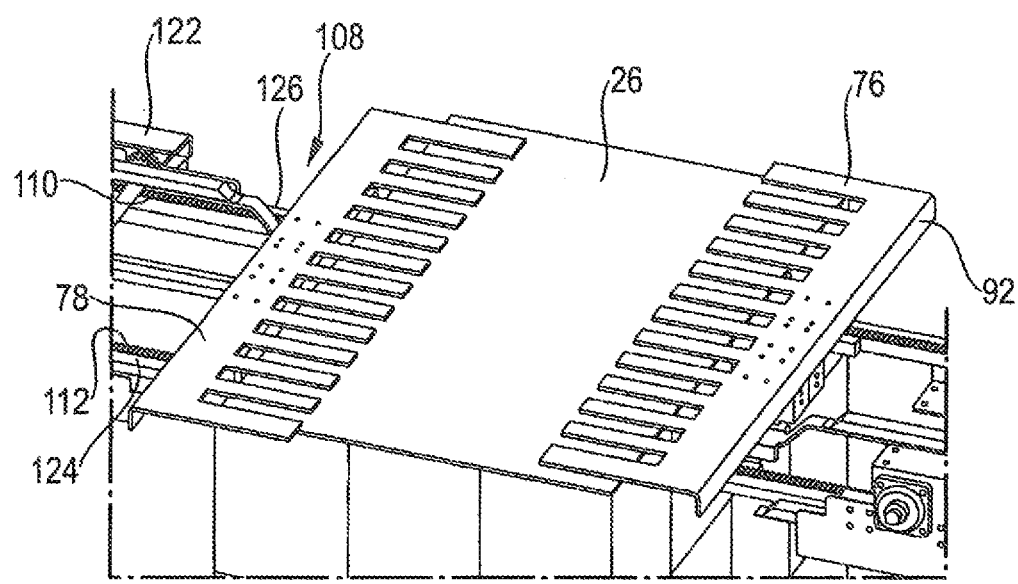
FIG. 16: a device for holding down an intermediate layer.

Such an embodiment is explained with FIGS. 15 to 17. FIG. 15 shows a partial display of the depalletizing system according to the invention in a state in which the layer 24 to be lifted is lifted from the rest of the layers stacked on the pallet by running in the removal unit 28. This removal unit 28 is embodied with two so-called wedge-shaped 'knife edges' 72, 74 which are run in under the layer 24 from both sides for lifting it. Thereby, the layer 24 may be stabilized with suitable down-holding devices such as a modular belt.

After this lifting, the source pallet is lowered and the pre-centered customer tray is run in or the separated layer 24 is moved outwards onto the customer tray 38.

In order to prevent that the intermediate layer 26 is also lifted from the layer remaining on the source pallet, according to FIG. 16, down-holding devices 76, 78 may be provided, which are brought into contact with this layer so that it remains on the source pallet. These down-holding devices 76, 78 are preferably movable synchronously with the source pallet.

Figure 17B:
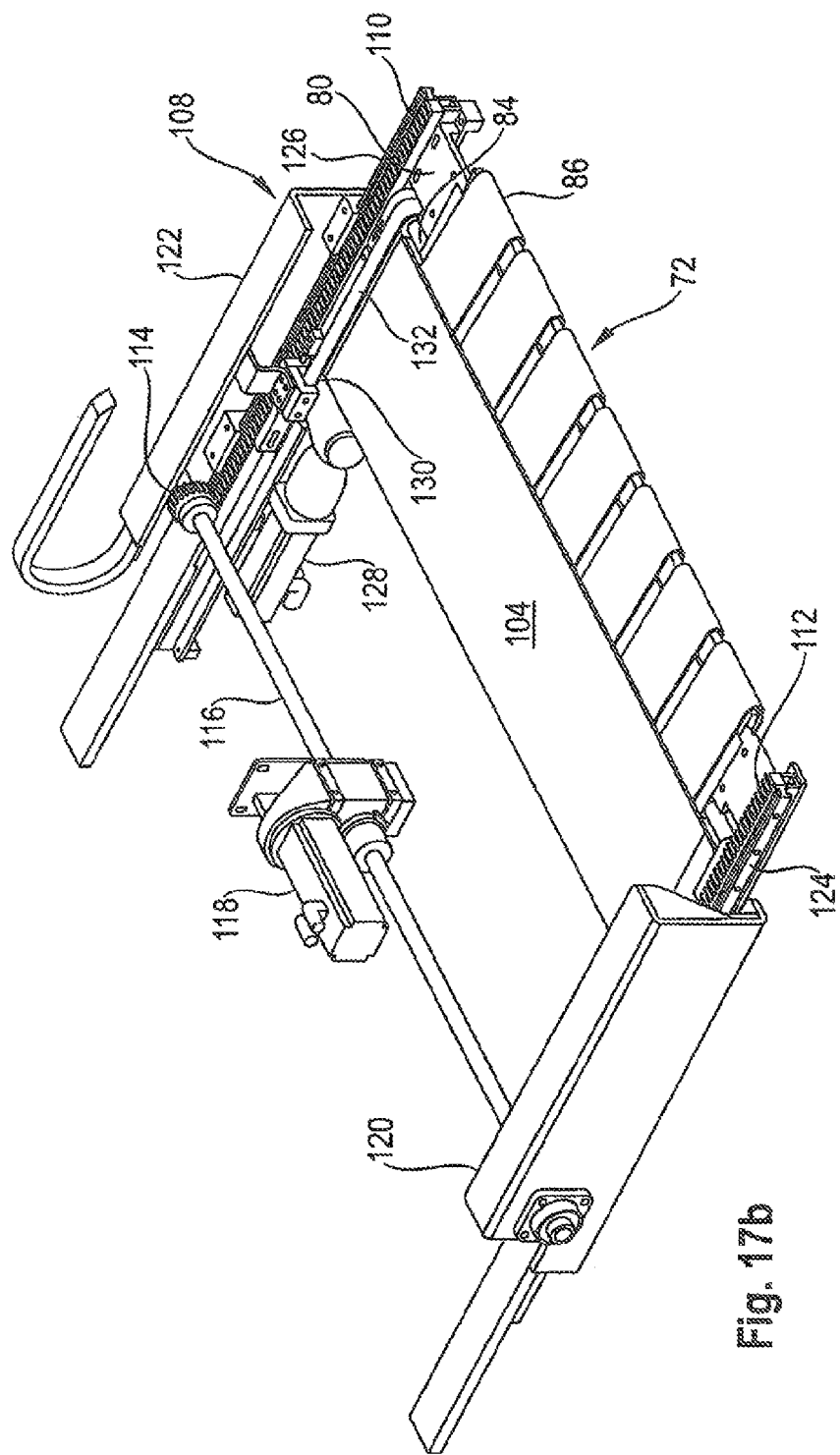
FIGS. 17 a, b: individual display of the removal unit with a knife edge.

FIG. 17a shows an individual display of the knife edge 72. According to this, it has a partially shown support frame 80 (see FIG. 17b), at which a drive gear 82 with a driveshaft 84 is mounted, via which a plurality of gear-belt-like belts 86 are driven, which are mounted on the support frame 80. In the shown embodiment, overall seven belts 86 are arranged lying next to each other. On the respective front sides of the knife edges 72, 74 facing each other (FIG. 15), deflection pulleys 88 are embodied whose diameter is according to the display in FIG. 15 a bit smaller than the diameter of the drive pinions 90, which are connected to the driveshaft 84 in a rotationally locked manner. The deflection pulleys 88 are not driven, but are merely entrained. As was explained, a fixed deflection may also be used instead of the deflection pulleys 88.

Due to the segment-shaped or cassette-shaped structure with a plurality of belts 86, adapting to different goods or to different widths of the source pallet 6 can be easily accomplished so that the depalletizing system 1 can be quickly converted for different requirements. As was explained, the knife edges 72, 74 are mounted in a guide frame to be movable towards each other and movable in height (vertically in FIG. 15) so they can be moved into the respective lifting position.

By running in the knife edges 72, 74 under the layer 24 to be lifted, as shown in FIG. 15, at least the cartons/products lying outwards are supported on a support plate 104, 106 arranged in alignment with the rear sides of the knife edges 72, 74, so that the entire layer 24 is supported either by the support plates 104, 106 or the belts 86 of the knife edge 72, 74 and is thus mostly relatively positioned.

The wedge-shaped diameter of the knife edges 72, 74 facilitates inserting and lifting in the regions between two adjacent layers. The material of the belt 36 is thereby chosen such that goods of different surface qualities and materials can be lifted.

FIG. 17b shows the removal unit with the knife edge 72 explained based on FIG. 17. The other knife edge 74 is embodied correspondingly.

According to the display in FIG. 17b, the support frame 80 supporting the belts 86 is guided on both sides at a linear guide 108 so that the knife edge 72 may be run in under the layer 24. The support frame 80 has two toothed racks 110, 112, which each engage with a feed pinion 114 of which only one can be seen in the display according to FIG. 17b. Both feed pinions 114 are connected with a driving shaft 116 of a stationarily-mounted feed motor 118. The end portions of the driving shaft 116 are mounted in two guide consoles 120, 122, which are guided along the guide rails 124, 126 of the support frame 80. By driving the feed motor 118, the two feed pinions 114 are rotated so that the toothed racks 110, 112 and thus the whole support frame 80 is shifted in the corresponding feed direction.

Driving the belts 86 is carried out as described in FIG. 17a, via a belt motor 128, which is mounted at the support frame 80, whose motor pinion 130 is connected to the drive gear 82 of the driveshaft 84, shown in FIG. 17a, via a gear belt 132. When the belt motor 128 is driven, all belts 86 are correspondingly driven via the drive pinions 90 mounted on the driveshaft 84.

Each knife edge of the removal unit is moreover embodied with the already described support plate 104, 106, which is also shiftable along the linear guide 108 and which is movable under the layer 24 to be separated as shown in FIG. 15. The down-holding device 78 or respectively 76 may also be mounted at the support frame 80 or the linear guide 108.

The surface of the belts 86 can be adapted to the good to be separated. Thus the belts may be embodied with a knob structure, made of a coating with a high friction coefficient, from a relatively soft coating, or a coating with bristles or the like to guarantee optimal separation. Due to the cassette-shaped structure, the separate belt segments can be easily changed to enable such adaption.

The removal unit with the two knife edges 72, 74 is an important component of the depalletizing systems 1.

The Applicants reserve for themselves to direct an own independent claim to the construction of the removal unit 28 with the knife edges 72, 74 as described in FIGS. 15 to 17a, b.

In the shown embodiment, the two down-holding devices 76, 78 are embodied in a comb-shape with downward-bent side walls 92; naturally, other suitable down-holding devices can be used.

The belts 86 embodied as cassette belts with the respective drive pinions 90 and deflection pulleys 88 may also be embodied modularly so that these cassettes are easily changeable.

It can happen for certain materials for the intermediate layer 26 that these cannot be lifted with the vacuum lifter 32. In this case, a blowing device 94, as is displayed in FIG. 18, can be used additionally or alternatively. According to this, the blowing device 94 has at least one compressed-air nozzle 96 which is oriented with regard to the layer 26 to be lifted. Thereby, a plurality of compressed-air nozzles 96 are arranged lying next to each other and their openings are directed at the separation gap. The intermediate layer 26 can be lifted from the layer 24 to be lifted by one or more compressed-air blasts controlled via a compressed-air supply and the machine control, and then be sucked off by a suction head 98 and moved to the so-called trash belt.

This version lends itself for very unstable or air-tight intermediate layers.

Based on FIG. 19, a version is explained with which the correct position of the source pallet 6 is controlled after lifting via the pallet lift 12. In this embodiment, the depalletizing system 1 has, for example, a sensing flap 100 on both sides of the product stack 22, which is flexibly guided at a side lay 102. When lifted via the pallet lift, the topmost layer runs onto the sensing flap 100 projecting perpendicularly from the side lay 102 (see '1' in FIG. 19). When lifting further, the sensing flap 100 is pivoted so that a reliable conclusion can be drawn about the position of the product stack 22 based on the pivoting angle. When further elevating the product stack 22, the completely deflected sensing flap 100 slides into the gap S between the side lay 102 and the product stack 22 so that the relative position towards the afore-described removal unit 28 is assured. These sensing flaps are flushly integrated in the layer centering of the depalletizing system according to the invention.

The depalletizing system according to the invention offers the user the possibility of assuring a failure-free, fully automatic depalletizing process with one operator per shift with a performance of 300 to 400 layers/hour.

A depalletizing system is disclosed which enables fully automatic depalletizing. Furthermore, a removal unit with at least one 'knife edge' is disclosed. The latter may have an all-around belt which wraps around a drive pinion and a deflection.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A depalletizing system for a plurality of products stacked on a pallet in layers, comprising a vacuum removal unit configured to lift a product layer from the product stack and a frictionally-engaging removal unit having at least one friction element configured to laterally apply to the product layer to lift the product layer from the product stack, wherein at least one support base can be run in, characterized by a control unit configured to drive the vacuum removal unit and the frictionally-engaging removal unit alternatively or synchronously, wherein to lift the product layer from the product stack, the control unit is configured to drive at least one of the vacuum removal unit and the frictionally-engaging removal unit.

2. The depalletizing system according to claim 1, comprising a pre-centering unit, via which the product stack freed from foil can be positionally centered, wherein the control unit is configured to control at least one of the removal unit and the vacuum removal unit, and the pre-centering unit.

3. The depalletizing system according to claim 1, comprising a lifter for taking off an intermediate or top product layer from the product stack and further comprising at least one of taking it to an output station, and, with a holding-down/retaining device, for positionally fixing the intermediate or top product layer on a product layer which is arranged underneath the lifted product layer.

4. The depalletizing system according to claim 3, comprising an intermediate-layer storage.

5. The depalletizing system according to claim 3, wherein the lifter is a vacuum lifter.

6. The depalletizing system according to claim 1, comprising a pallet lift, via which the pallet is conveyable, and which is controllable by the control unit.

7. The depalletizing system according to claim 6, wherein the pallet lift comprises support posts, which support at least one of the product stack and the pallet.

8. The depalletizing system according to claim 1, wherein the control unit is configured to control the holding force of the layer centering depending on the product.

9. The depalletizing system according to claim 1, comprising a discharging station for supplying an empty customer tray onto which the lifted product layer can be put down.

10. The depalletizing system according to claim 5, wherein at least one of the removal unit, the vacuum removal unit and the lifter are arranged above the layer centering unit.

11. The depalletizing system according to claim 3, wherein the removal unit is arranged below at least one of the vacuum removal unit and the lifter.

12. The depalletizing system according to claim 1, wherein the vacuum removal unit and the lifter are movably arranged in parallel.

13. The depalletizing system according to claim 1, wherein the friction element is embodied as a friction roller or a knife edge, which laterally seizes the product layer in a frictionally-engaged way.

14. The depalletizing system according to claim 13, wherein friction elements seize the product layer on both sides and two support base segments may be run in.

15. The depalletizing system according to claim 1, comprising sensors for detecting a separation level between the product layer to be lifted and the next product layer of the product stack.

16. A removal unit for the depalletizing system according to claim 13, comprising at least one belt, which wraps around a deflection and a drive gear, wherein the belt is in an operative engagement with the drive gear in a frictionally-engaged or form-fitted way.

17. The removal unit according to claim 16, wherein the belt is embodied as a gear-belt profile.

18. The depalletizing system according to claim 1, wherein the control unit drives the vacuum removal unit and the frictionally-engaging removal unit alternatively or synchronously.

19. The removal unit of claim 16, wherein the drive gear is a drive pinion.

* * * * *